United States Patent [19]

Shushlebin et al.

[11] 4,229,214

[45] Oct. 21, 1980

[54] PROCESS FOR COMBINED PRODUCTION OF FERROSILICOZIRCONIUM AND ZIRCONIUM CORUNDUM

[76] Inventors: Boris A. Shushlebin, Sirenevy bulvar, 27, korpus 3, kv. 53; Nikolai P. Lyakishev, 1 Parkovaya ulitsa, 8, kv. 51, both of Moscow; Viktor V. Tregubenko, ulitsa Zavodskaya, 6, kv. 2 Krasnogorsk, Moskovskaya oblast; Gennady F. Ignatenko, ulitsa Klubnaya, 9, kv. 19; Nikolai I. Subbotin, ulitsa Klubnaya, 9, kv. 3, both of poselok Dvurechensk, Sverdlovskaya oblast, all of U.S.S.R.

[21] Appl. No.: 43,956

[22] Filed: May 30, 1979

[51] Int. Cl.² .................... C22B 5/00; C22C 28/00
[52] U.S. Cl. .................... 75/133; 75/10 R; 75/134 R; 75/134 F; 75/135
[58] Field of Search ............... 75/133, 134 R, 134 F, 75/135, 10 R, 11, 27

[56] References Cited

U.S. PATENT DOCUMENTS

| | | | |
|---|---|---|---|
| 2,905,548 | 9/1959 | Taylor | 75/27 |
| 2,905,549 | 9/1959 | Taylor | 75/27 |
| 3,021,562 | 2/1962 | Chisholm | 75/10 R |
| 3,101,267 | 8/1963 | Dunn | 75/10 R |
| 3,425,826 | 2/1969 | Schmidt | 75/10 R |
| 4,080,194 | 3/1978 | Fey | 75/10 R |

*Primary Examiner*—P. D. Rosenberg
*Attorney, Agent, or Firm*—Ladas & Parry

[57] ABSTRACT

A process for a combined production of ferrosilicozirconium and zirconium corundum comprising melting of a zirconic concentrate, an iron ore and aluminium taken in a weight ratio therebetween of 51–69:9.9–16.5:19.8–34.8 respectively at a temperature of 1,950° to 2,000° C. and separately casting the resulting desired products; prior to casting zirconium corundum, alumina is added thereto in an amount ranging from 0.5 to 50% by weight of zirconium concentrate and alumina is melted at a temperature of 1,950° to 2,000° C. The process according to the present invention makes it possible to jointly produce high-quality ferrosilicozirconium and zirconium corundum using single technology. Incorporation of alumina makes it possible to reduce the content of silica in zirconium corundum to 0.6% by weight, that of calcium oxide—down to 0.4% by weight, total iron content—to 0.2% by weight. Furthermore, incorporation of alumina makes it possible to increase productivity of process equipment (i.e. increase the output of zirconium corundum per one melting).

1 Claim, No Drawings

PROCESS FOR COMBINED PRODUCTION OF FERROSILICOZIRCONIUM AND ZIRCONIUM CORUNDUM

FIELD OF THE INVENTION

The present invention relates to the art of ferrous metallurgy and, more specifically, to processes for a combined production of ferrosilicozirconium and zirconium corundum.

Ferrosilicozirconium is employed for deoxydation and alloying of steels, cast iron and alloys for different applications; zirconium corundum is used for the manufacture of abrasive tools for grinding of steel ingots and blanks prior to rolling.

BACKGROUND OF THE INVENTION

Known in the art is a process for a combined production of ferrosilicozirconium and zirconium corundum by melting a zirconic concentrate, an iron ore and aluminum taken in a weight ratio of 51–69:9.9–16.5:19–.8–34.8 respectively at a temperature of 1,950° to 2,000° C., followed by separate casting of the resulting desired products (cf. USSR Inventor's Certificate No. 608845, Bulletin for Inventions and Discoveries of the USSR, No. 20, 1978).

This prior art process has a disadvantage residing in the production of corundum with a relatively high content of calcium oxide (up to 3% by weight), silica (up to 2.5% by weight) and total iron, i.e. metallic iron and ferrous oxide (up to 1.5%) which is associated with a relatively high content of said oxides in the starting charge materials, i.e. zirconic concentrate and iron ore. The presence, in the composition of zirconium corundum, of calcium oxide and silica in the above-indicated amounts makes impossible, in some cases, the use of zirconium corundum for the manufacture of abrasive wheels intended for force grinding of ingots and blanks made of especially durable grades of steel.

SUMMARY OF THE INVENTION

It is an object of the present invention to provide such a process for a combined production of ferrosilicozirconium and zirconium corundum which would make it possible to produce zirconium corundum suitable for the manufacture of abrasive tools including abrasive wheels intended for a force grinding of ingots and blanks made of especially durable grades of steel.

This and other objects of the present invention are accomplished by a process for a combined production of ferrosilicozirconium and zirconium corundum comprising melting a zirconic concentrate, an iron ore and aluminum taken in a weight ratio of 51–69:9.9–16.5:19–.8–34.8 respectively at a temperature of 1,950° to 2,000° C. and separately casting the resulting desired product, wherein in accordance with the present invention, prior to casting of zirconium corundum alumina is introduced thereinto in an amount ranging from 0.5 to 50% by weight of the zirconic concentrate and alumina is then melted at a temperature of 1,950° to 2,000° C.

Incorporation of alumina (commercial aluminium oxide) ensures the production of zirconium corundum with a smaller content of impurities (silica, calcium oxide, total iron), since the melt of zirconium corundum is diluted with alumina containing said impurities in an amount which is by 4–5 times lesser. Thus, the content of silica in zirconium corundum can be reduced down to 0.6% by weight, that of calcium oxide—to 0.4% by weight, total iron—down to 0.2% by weight. Zirconium corundum with a lessened content of said impurities features high abrasion properties. Abrasive wheels manufactured therefrom are suitable for a force grinding of ingots and blanks made of special-strength steel grades.

Furthermore, incorporation of alumina makes it possible to increase productivity of the process equipment (increase the output of zirconium per one melting).

The process according to the present invention makes it possible, rather simply, to jointly produce ferrosilicozirconium and zirconium corundum. Therewith, zirconium is totally recovered from the starting zirconic concentrate to the desired products. The combined production of the above-mentioned described products makes it possible to make the production costs substantially lower than in the case of separate output of these products. Quality of the products obtained in the process according to the present invention is similar to quality of the products produced separately. Thus, the resulting ferrosilicozirconium has a melting point within the range of from 1,350° to 1,420° C. which explains its good solubility in steels, cast irons and alloys for various applications upon deoxydation and alloying of the latter. Furthermore, ferrosilicozirconium can be readily disintegrated to particles of a required size.

The process according to the present invention makes it possible to avoid the formation of zirconium-containing waste slags finding to use in the industry.

DETAILED DESCRIPTION OF THE INVENTION

The process for a combined production of ferrosilicozirconium and zirconium corundum according to the present invention is performed in the following manner.

Into a melting apparatus such as an electric arc furnace the starting charge materials, i.e. zirconic concentrate, iron ore and aluminium, preferably in a powderliek form, are charged in predetermined weight proportions. Then said charge materials are melted at a temperature of 1,950°–2,000° C. On completion of the melting process a melt of ferrosilicozirconium and zirconium corundum is obtained. Into zirconium corundum, prior to casting thereof, alumina is added in an amount ranging from 0.5 to 50% by weight of the starting zirconic concentrate and said alumina is melted at a temperature of 1,950° to 2,000° C. On completion of the process of alumina melting, separate casting of the desired products from the electric furnace is effected (ferrosilicozirconium and zirconium corundum), e.g. into heavy-duty metal ingot molds provided with a system of air- or water-cooling. Since the specific gravity of zirconium corundum is lower than that of ferrosilicozirconium and the layer of zirconium corundum melt is located over the layer of ferrosilicozironcium melt, it is advisable to perform first casting of zirconium corundum and afterwards—casting of ferrosilicozirconium.

Prior to introduction of alumina into zirconium corundum, it is also possible to perform casting of ferrosilicozirconium.

To perform cooling of zirconium corundum at a high speed (in order to obtain a microcrystalline structure), it is advisable to divide said charge materials into several portions prior to melting. Alumina should be also divided into the same number of portions. After melting of the first portion of the charge materials at a temperature of 1,950°–2,000° C., onto the upper layer, comprising zirconium corundum, there is charged the first portion of alumina and the latter is melted at a temperature of 1,950° to 2,000° C. On completion of the process of melting of alumina, zirconium corundum is cast. Onto the lower layer remaining in the electric furnace and comprising ferrosilicozirconium another portion of the charge materials is placed and the thus-charged portion is melted at the above-specified tempeature. Then, still another portion of alumina is charged and melted at the same temperature. Thereafter, the upper layer (zirconium corundum) is cast from the furnace and the above-described operations are repeated in the same sequence. Therefore, ferrosilicozirconium is accumulated in the furnace, while zirconium corundum obtained after every melting of a further portion of alumina is cast to ingot molds and cooled at a high speed to obtain a microcrystalline structure. After charging of the last portion of the charge materials and melting thereof, charging of the last portion of alumina and melting thereof, first cast is zirconium corundum and then—ferrosilicozirconium.

For a better understanding of the present invention, some specific Examples are given hereinbelow by way of illustration of particular embodiments of the process for a combined production of ferrosilicozirconium and zirconium corundum. In all the Examples use is made of a zirconic concentrate, an iron ore, aluminum powder and alumina having the same chemical composition. This, however, does not limit the possibilities for using said materials with different chemical compositions and obtaining the results which are not inferior to those produced according to the process of this invention.

EXAMPLE 1

Into an electric arc furnace there are charged 2,400 kg of a zirconic concentrate containing 65% by weight of zirconia and 32% by weight of silica, 480 kg of an iron ore containing 96% by weight of ferric oxide, and 840 kg of aluminium powder containing 90% by weight of aluminium. The weight ratio between said charge components is equal to 64.5:12.9:22.6 respectively. The charged materials are melted at the temperature of 2,000° C. for 3.5 hours. As a result, there are obtained 1,100 kg of ferrosilicozirconium consisting of 40.7% by weight of zirconium, 27% by weight of iron, 29.4% by weight of silicon, 1.1% by weight of aluminium, 1.8% by weight of accompanying impurities (copper, carbon and the like), and 2,400 kg of zirconium corundum consisting of 39.3% by weight of zirconia, 54.3% by weight of alumina, 2.0% by weight of silica, 0.8% by weight of calcium oxide, 2.1% by weight of magnesia, 1.5% by weight of total iron. Prior to casting, to zirconium corundum positioned above the layer of ferrosilicozirconium there are added 240 kg of alumina containing 99.4% by weight of aluminium oxide and said alumina is melted at the temperature of 2,000° C. to give, as a result, 2,630 kg of zirconium corundum consisting of 35.9% by weight of zirconia, 58.3% by weight of alumina, 1.8% by weight of silica, 0.7% by weight of calcium oxide, 1.9% by weight of magnesia, 1.4% by weight of total iron.

Ferrosilicozirconium and zirconium corundum are separately cast from the electric arc furnace into heavy-duty metallic ingot molds and air-cooled.

EXAMPLE 2

In a manner similar to that described in the foregoing Example 1 there are obtained 1,100 kg of ferrosilicozirconium of the above-mentioned chemical composition and 2,400 kg of zirconium corundum of the above-mentioned chemical composition. Prior to casting of zirconium corundum, it is added with 600 kg of alumina containing 99.4% by weight of aluminium oxide and said alumina is melted at the temperature of 2,000° C. As a result, there are obtained 2,925 kg of zirconium corundum consisting of 32.3% by weight of zirconia, 62.5% by weight of alumina, 1.6% by weight of silica, 0.7% by weight of calcium oxide, 1.7% by weight of magnesia and 1.2% by weight of total iron.

EXAMPLE 3

Into an electric arc furnace there are charged 100 kg of a zirconic concentrate containing 65% by weight of zirconia, 32% by weight of silica; 24 kg of an iron ore containing 96% by weight of ferric oxide, and 61 kg of aluminium powder containing 90% by weight of aluminium. The weight ratio between said charge components is equal to 54:13:33 respectively. The charged materials are melted at the temperature of 1,950° C. for 40 minutes. As a result, there are obtained 73 kg of ferrosilicozirconium consisting of 45.8% by weight of zirconium, 19.5% by weight of iron, 22.4% by weight of silicon, 9% by weight of aluminium, 3.3% by weight of accompanying impurities (copper, carbon and the like), and 105 kg of zirconium corundum consisting of 16.9% by weight of zirconia, 78.9% by weight of alumina, 1.1% by weight of silica, 0.7% by weight of calcium oxide, 1% by weight of magnesia and 1.4% by weight of total iron. Ferrosilicozirconium is cast into lined metallic ingot molds and cooled. Into zirconium corundum, prior to casting thereof, there are introduced 50 kg of alumina containing 99.4% by weight of aluminium oxide and said alumina is melted at the temperature of 1,950° C. to give, as a result, 155 kg of zirconium corundum consisting of 11.5% by weight of zirconia, 85.6% by weight of alumina, 0.8% by weight of silica, 0.5% by weight of calcium oxide, 0.7% by weight of magnesia and 0.9% by weight of total iron.

EXAMPLE 4

Into an electric arc furnace there are charged 2,400 kg of a zirconic concentrate containing 65% by weight of zirconia, and 32% by weight of silica, 480 kg of an iron ore containing 96% by weight of ferric oxide, and 1,320 kg of aluminium powder containing 90% by weight of aluminium. The weight ratio of said charge components is equal to 57.2:11.4:31.4 respectively. The charged materials are melted at the temperature of 1,960° C. for 3.4 hours to give, as a result, 1,650 kg of ferrosilicozirconium consisting of 51.7% zirconium, 18.1% by weight of iron, 19.8% by weight of silicon, 8.6% by weight of aluminium, 1.8% by weight of accompanying impurities (copper, carbon and the like) and 1,990 kg of zirconium corundum consisting of 20.4% by weight of zirconia, 78% by weight of alumina, 0.7% by weight of silica, 0.5% by weight of calcium oxide, 0.1% by weight of magnesia, 0.3% by weight of total iron. Prior to casting, to zirconium corundum located over the layer of ferrosilicozirconium there was added 12 kg of alumina containing 994% by weight of aluminium oxide and said alumina is melted at the temperature of 1,960° C. to give, as a result, 2,000 kg of zirconium corundum consisting of 20.2% by weight of zirconia, 78.5% by weight of alumina, 0.6% by weight of silica, 0.4% by weight of calcium oxide, 0.1% by weight of magnesia and 0.2% by weight of total iron.

Ferrosilicozirconium and zirconium corundum are separately cast from the destric arc furnace into heavy-duty metallic ingot molds and cooled.

EXAMPLE 5

Into an electric arc furnace there are charged 2,400 kg of a zirconic concentrate, 635 kg of an iron ore and 1,620 kg of aluminium powder. The weight ratio between said charge components is equal to 51.6:13.6:34.8 respectively. The charged materials are melted at the temperature of 1,960° C. for 3.6 hours to give, as a result, 1,680 kg of ferrosilicozirconium consisting of 48% by weight of zirconium, 22.1% by weight of iron, 19.2% by weight of silicon, 9.5% by weight of aluminium, 1.2% by weight of accompanying impurities (copper, carbon and the like) and 2,600 kg of zirconium corundum consisting of 17.5% by weight of zirconia, 76.9% by weight of alumina, 1.1% by weight of silica, 1.0% by weight of calcium oxide, 2.7% by weight of magnesia and 0.8% by weight of total iron. Prior to casting, to zirconium corundum there are added 840 kg of alumina containing 99.4% by weight of aluminium oxide and said alumina is melted at the temperature of 1,960° C. to give, as a result, 3,400 kg of zirconium corundum consisting of 13.4% by weight of zirconia, 82.3% by weight of alumina, 0.8% by weight of silica, 0.8% by weight of calcium oxide, 2.1% by weight of magnesia and 0.6% by weight of total iron.

From the electric arc furnace the products are cast separately into heavy-duty metallic ingot molds, first zirconium corundum and then ferrosilicozirconium.

EXAMPLE 6

Into an electric arc furnace there are charged 105 kg of a zirconic concentrate, 15 kg of an iron ore and 32 kg of aluminium powder. The weight ratio between said charge components is equal to 69:9.9:21.1 respectively. The charged components are melted at the temperature of 2,000° C. for 35 minutes to give, as a result, 34 kg of ferrosilicozirconium consisting of 34.5% by weight of zirconium, 29.5% by weight of iron, 34.6% by weight of silicon, 0.7% by weight of aluminium, 0.7% by weight of accompanying impurities, and 110 kg of zirconium corundum consisting of 46% by weight of zirconia, 48.9% by weight of alumina, 2.3% by weight of silica, 0.7% by weight of calcium oxide, 0.5% by weight of magnesia and 1.6% by weight of total iron. Prior to casting, to zirconium corundum there are added 21 kg of alumina and said alumina is melted at the temperature of 2,000° C. to give 130 kg of zirconium corundum consisting of 38.9% of zirconia, 56.8% by weight of alumina, 1.9% by weight of silica, 0.6% by weight of calcium oxide, 0.4% by weight of magnesia, 1.4% by weight of total iron.

Ferrosilicozirconium and zirconium corundum are separately cast from the electric arc furnace into heavy-duty metallic ingot molds and cooled.

EXAMPLE 7

The following charge materials are placed into an electric arc furnace: zirconic concentrate in the amount of 2,400 kg, iron ore in the amount of 571.2 kg and aluminium powder in the amount of 732 kg. The weight ratio between said charge components is equal to 64.8:15.4:19.8 respectively. First charged into the electric arc furnace is ⅓ of the total amount of the mixture of said charge components and said portion is melted at the temperature of 2,000° C. for the period of 1.2 hour. After melting of the first portion of the mixture of said charge components ferrosilicozirconium is obtained consisting of 23.9% by weight of zirconium, 39.7% by weight of iron, 33.4% by weight of silicon, 0.6% by weight of aluminium, 2.4% by weight of accompanying impurities and zirconium corundum consisting of 48.1% by weight of zirconia, 46.2% by weight of alumina, 2.4% by weight of silica, 0.9% by weight of calcium oxide, 1.0% by weight of magnesia and 1.4% by weight of total iron. Prior to casting, zirconium corundum is added with 300 kg (⅓ portion of the total amount) of alumina and said alumina is melted at the temperature of 2,000° C. to give, as a result, 1,230 kg of zirconium corundum consisting of 37.5% by weight of zirconia, 58% by weight of alumina, 1.9% by weight of silica, 0.7% by weight of calcium oxide, 0.8% by weight of magnesia and 1.1% by weight of total iron. Zirconium corundum is cast into heavy-duty metallic ingot molds and air-cooled. To the ferrosilicozirconium remaining in the furnace there is added another ⅓ portion of the total amount of the charge materials mixture and said portion is melted at the temperature of 2,000° C. for the period of 1.1 hr to give, as a result, ferrosilicozirconium having the above-specified chemical composition and zirconium corundum also having the above-mentioned chemical composition (prior to the addition of alumina). Before casting, zirconium corundum is added with another ⅓ portion of the total amount of alumina and this portion of alumina is melted at the temperature of 2,000° C. As a result, there are obtained 1,230 kg more of zirconium corundum having the above-mentioned chemical composition (after the addition of alumina). Zirconium corundum is cast into heavy-duty metallic ingot molds and air-cooled. The ferrosilicozirconium remaining in the furnace is added with the last ⅓ portion of the total amount of the charge mixture materials and said mixture is melted at the temperature of 2,000° C. for one hour. As a result, there are obtained 868 kg (total amount of the three melting operations) of ferrosilicozirconium having the above-given chemical composition and zirconium corundum also having the above-mentioned chemical composition (prior to the addition of alumina). Prior to casting, zirconium corundum is added with the last ⅓ portion of the total amount of alumina and said alumina is melted at the temperature of 2,000° C. As a result, there are obtained 1,230 kg more of zirconium corundum of the above-mentioned chemical composition (after the addition of alumina). Zirconium corundum and ferrosilicozirconium are separately cast from the electric arc furnace into heavy-duty metallic ingot molds and cooled.

EXAMPLE 8

Into an electric arc furnace there are charged 1,600 kg of a zirconic concentrate, 420.8 kg of an iron ore and 539.2 kg of aluminium powder. The weight ratio between said charge materials is 62.5:16.4:21.1 respectively. The charged materials are melted at the temperature of 2,000° C. for 2.1 hours to give, as a result, 650 kg of ferrosilicozirconium consisting of 28% by weight of zirconium, 39% by weight of iron, 30.3% by weight of silicon, 0.6% by weight of aluminium, 2.1% by weight of accompanying impurities, and 1,900 kg of zirconium corundum consisting of 44.5% by weight of zirconia, 50.3% by weight of alumina, 2.2% by weight of silica, 0.8% by weight of calcium oxide, 1.2% by weight of magnesia and 1.2% by weight of total iron. Prior to casting, zirconium corundum is added with 400 kg of alumina and said alumina is melted at the temperature of 2,000° C. to give, as a result, 2,250 kg of zirconium corundum consisting of 37.6% by weight of zirconia, 58% by weight of alumina, 1.9% by weight of silica, 0.7% by weight of calcium oxide, 1.0% by weight of magnesia, 0.8% by weight of total iron.

Ferrosilicozirconium and zirconium corundum are separately cast from the furnace to heavy-duty metallic ingot molds and air-cooled.

What is claimed is:

1. A process for combined production of ferrosilicozirconium and zirconium corundum which comprises melting a zirconic concentrate, iron ore and aluminum in a weight ratio 51–69:9–16.5:19.8–34.8 respectively, at a temperature of 1950° to 2000° C. to form a melt having an upper layer of zirconium corundum and a lower layer of ferrosilicozirconium, adding to said melt from 0.5 to 50% by weight of zirconic concentrate of alumina and subsequently casting the upper and lower layers separately.

* * * * *